United States Patent [19]

Cheng

[11] Patent Number: 5,645,277
[45] Date of Patent: Jul. 8, 1997

[54] CONTROLLER FOR A VIDEO GAME CONSOLE

[75] Inventor: Chou Cheng, Miao-Li Hsien, Taiwan

[73] Assignee: Top Game & Company Ltd., Taipei, Taiwan

[21] Appl. No.: 556,509

[22] Filed: Nov. 13, 1995

[30] Foreign Application Priority Data

Nov. 15, 1994 [CN] China .................. 94243459.5

[51] Int. Cl.$^6$ ........................................... A63F 9/22
[52] U.S. Cl. ................ 273/148 B; 463/37; 463/46; 345/156
[58] Field of Search .............. 273/148 B; 463/36, 463/37, 38, 39, 46, 47; 345/156, 158, 161

[56] References Cited

U.S. PATENT DOCUMENTS

| | | | |
|---|---|---|---|
| 4,588,187 | 5/1986 | Dell | 463/36 X |
| 4,816,810 | 3/1989 | Moore | 273/148 B X |
| 4,924,216 | 5/1990 | Leung | 273/148 B X |
| 5,421,590 | 6/1995 | Robbins | 463/37 |
| 5,551,701 | 9/1996 | Bouton et al. | 273/148 B X |

*Primary Examiner*—Raleigh W. Chiu
*Attorney, Agent, or Firm*—Finnegan, Henderson, Farabow, Garrett & Dunner

[57] ABSTRACT

A controller for a video game console includes first and second handheld control units. Each of the handheld control units has a housing with a finger operating surface that is provided with a control button unit, and a transmitting unit for transmitting signals to the video game console when the control button unit is operated. An interconnecting unit is provided for releasably interconnecting the housings of the handheld control units.

12 Claims, 6 Drawing Sheets

CONTROLLER FOR A VIDEO GAME CONSOLE

BACKGROUND OF THE INVENTION

1. Field of the Invention

This invention relates to a controller for a video game console, more particularly to a controller which has separable handheld control units.

2. Description of the Related Art

FIG. 1 shows a conventional video game console which utilizes two conventional controllers. The conventional video game console includes a casing 10 formed with a receiving slot 11 for receiving a game cartridge (not shown), and a processing unit (not shown) which is disposed in the casing 10 and which is adapted to process data in the game cartridge when the latter is received in the slot 11. Each of the conventional controllers has a handheld control unit 1 which comprises a housing 14 with a finger operating surface provided with a plurality of control buttons 15, and cable means 12, connected electrically to the processing unit, for transmitting signals to the processing unit when the control buttons 15 are operated.

Use of the aforementioned conventional controller with a video game console results in the following drawbacks:

1. Since all of the control buttons 15 are provided on the finger operating surface of the housing 14, and since the size of the housing 14 is relatively small, it is inconvenient for the user to operate the control buttons 15 simultaneously with his two hands. This situation is aggravated when the user has relatively big hands.

2. Since all of the control buttons 15 are provided on the finger operating surface of the housing 14, the entire conventional controller has to be replaced even though only one of the control buttons 15 is damaged after a period of use.

3. Since all of the control buttons 15 are provided on the finger operating surface of the housing 14, it is inconvenient for a more experienced user to assist a less experienced user in operating some of the control buttons 15 on the housing 14.

SUMMARY OF THE INVENTION

Therefore, the objective of the present invention is to provide a controller for a video game console, which controller can overcome the drawbacks that are commonly associated with the aforementioned prior art.

According to the present invention, a controller for a video game console includes first and second handheld control units. Each of the handheld control units has a housing with a finger operating surface that is provided with a control button unit, and means for transmitting signals to the video game console when the control button unit is operated. An interconnecting means is provided for releasably interconnecting the housings of the handheld control units.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
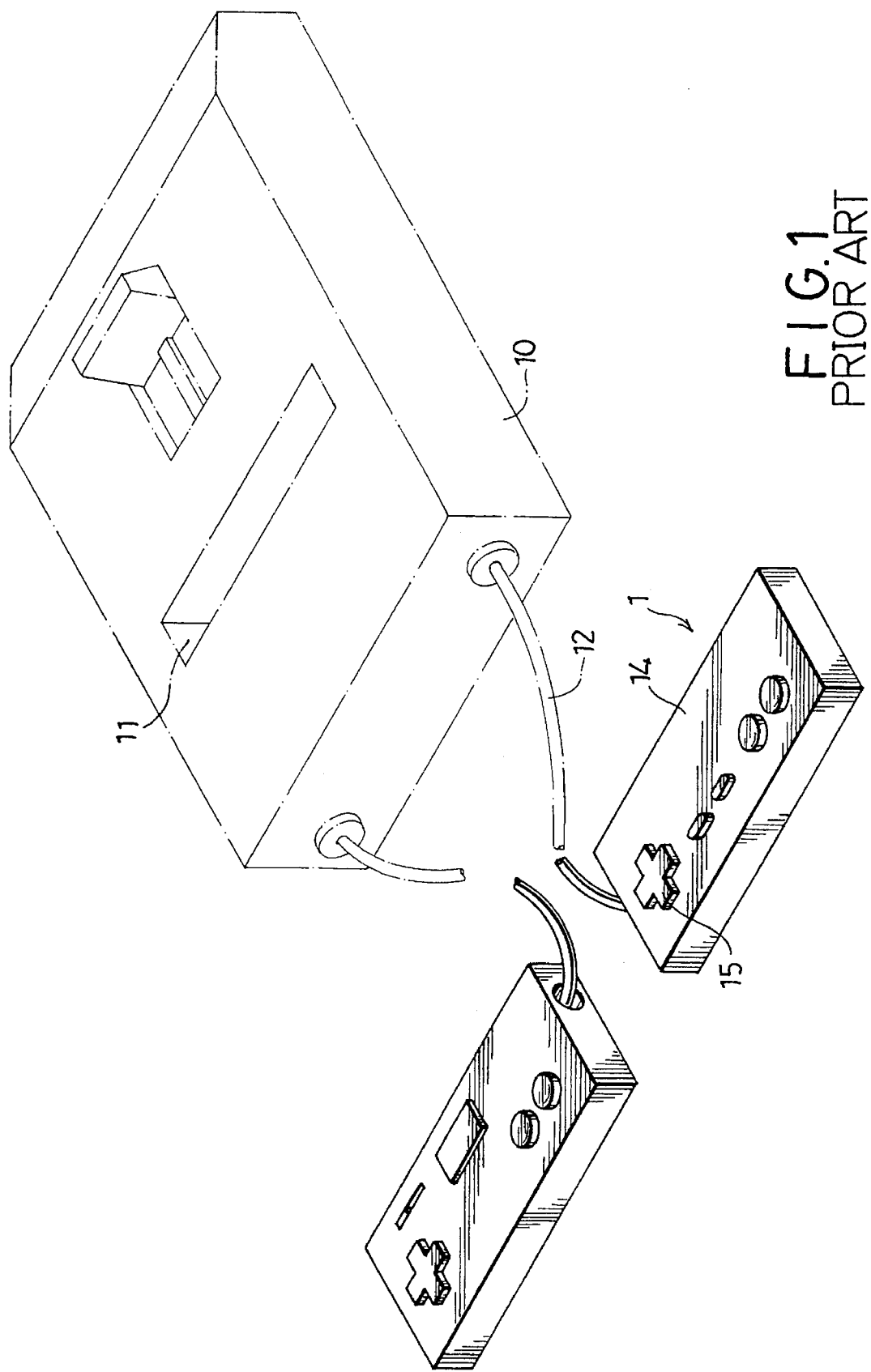
FIG. 1 is a schematic perspective view showing conventional controllers for a video game console.
Figure 2:
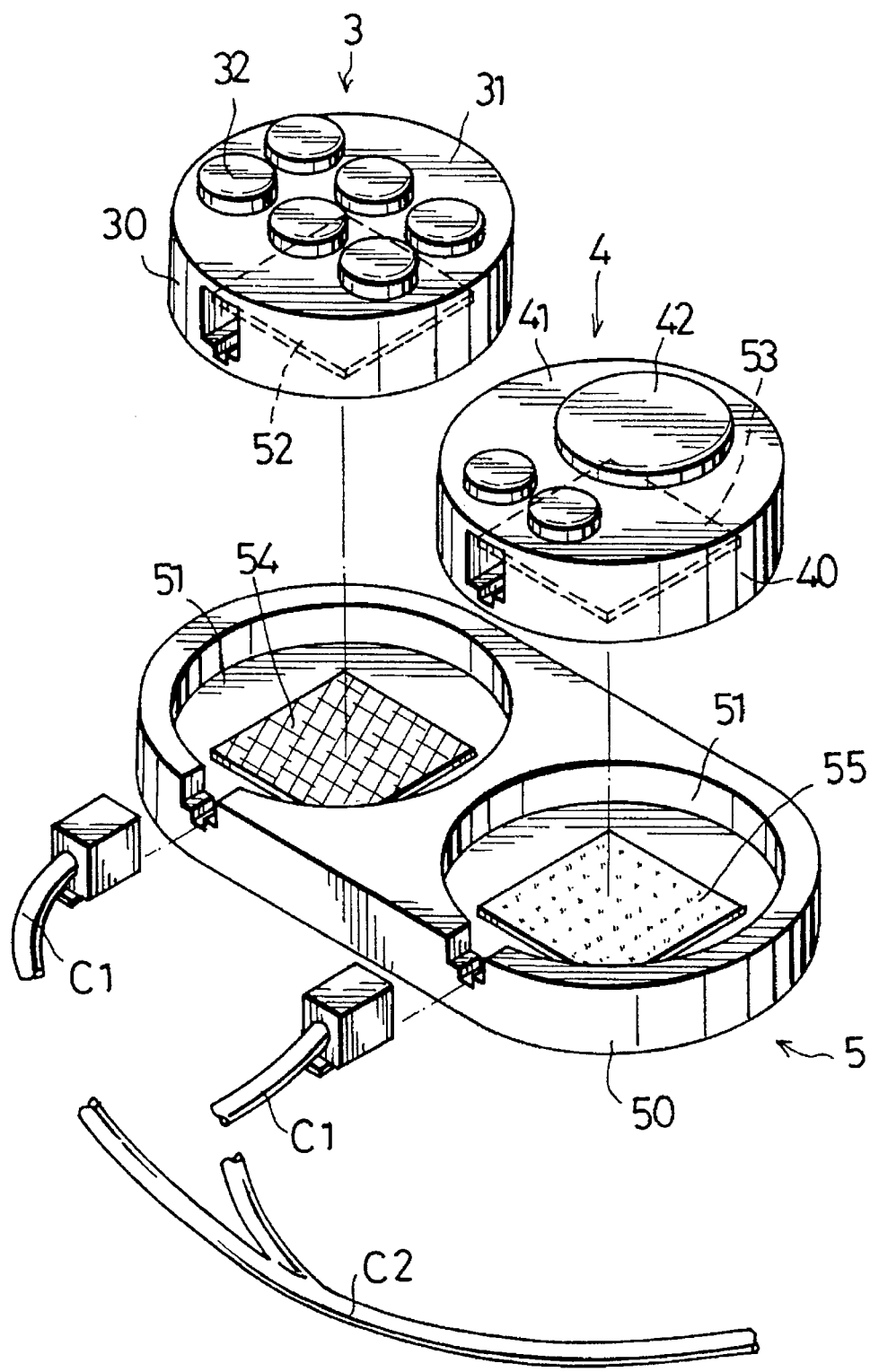
FIG. 2 is a schematic exploded view showing a controller for a video game console in accordance with a first preferred embodiment of the present invention.
Figure 5:
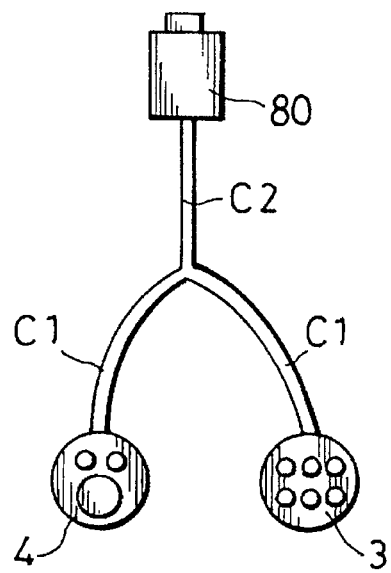
FIG. 5 is a schematic view illustrating the electrical connection between a video game console and the first preferred embodiment shown in FIG. 2.

Referring to FIGS. 2 and 5, the first preferred embodiment of a controller for a video game console (not shown) in accordance with the present invention includes first and second handheld control units, 3 and 4, and an interconnecting means 5. Each of the control units, 3 and 4, has a housing 30,40 with a finger operating surface 31,41 which is provided with a control button unit and a bottom surface which is opposite to the finger operating surface 31,41. Each of the control button unit includes at least one control button 32,42. In the present embodiment, the control button unit of each of the control units 3,4 is shown to be provided with four control buttons 32,42.

The controller of the present embodiment further includes a connector 80 which is adapted to be connected electrically to a processing unit (not shown) of the video game console. Each of the control units 3,4 further has a transmitting means (shown in phantom lines) which includes a cable (C1) having one end portion connected electrically to the control button unit thereof and an opposite end portion connected electrically to the connector 80 via a cable (C2) and which transmits signals to the processing unit of the video game console when the control buttons 32,42 are operated.

The interconnecting means 5 includes a retaining seat 50 having a top side formed with a pair of spaced retaining recesses 51. Each of the retaining recesses 51 receives removably a respective one of the housings 30,40 therein and has a recess bottom provided with one of male and female fasteners, 54 and 55, such as VELCRO hook-and-loop fastening straps. The interconnecting means 5 further includes male and female fasteners, 52 and 53, which are provided respectively on the bottom surfaces of the housings 30,40.

Figure 3:
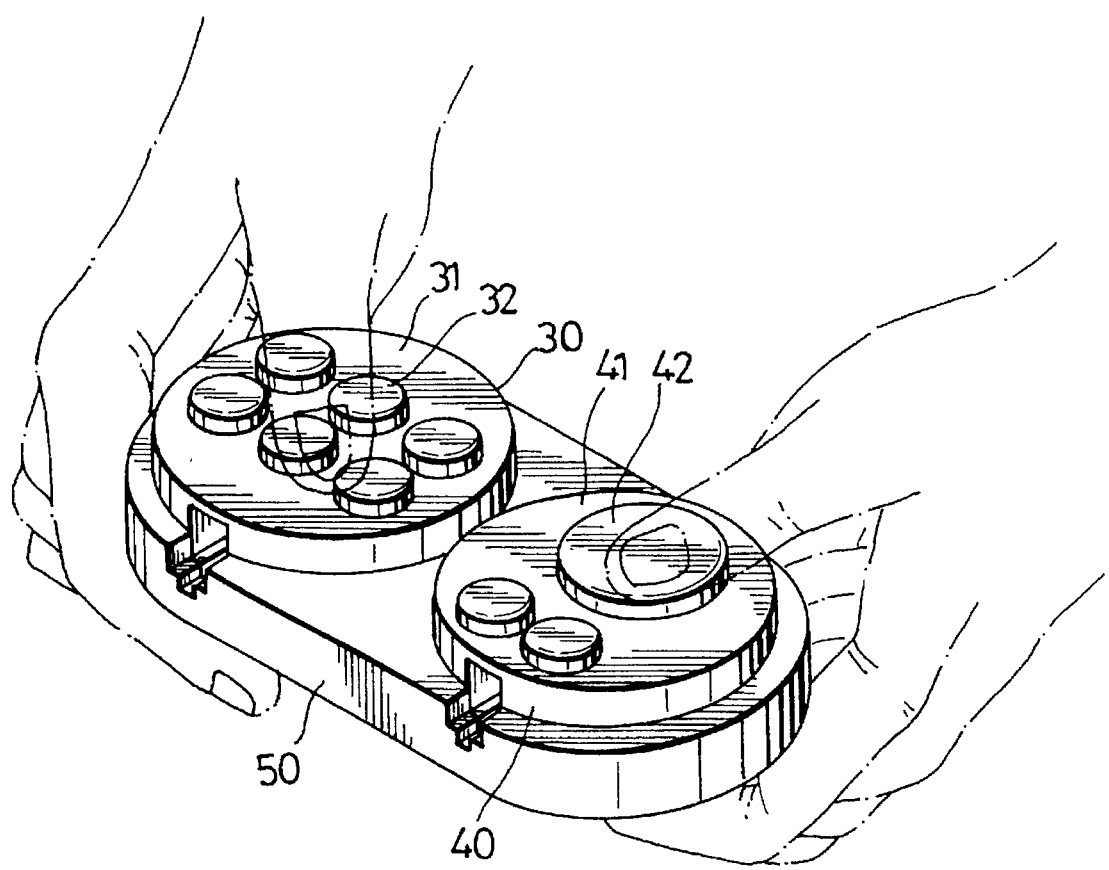
FIG. 3 is a schematic perspective view illustrating the assembled controller shown in FIG. 2 when in use.
Figure 4:
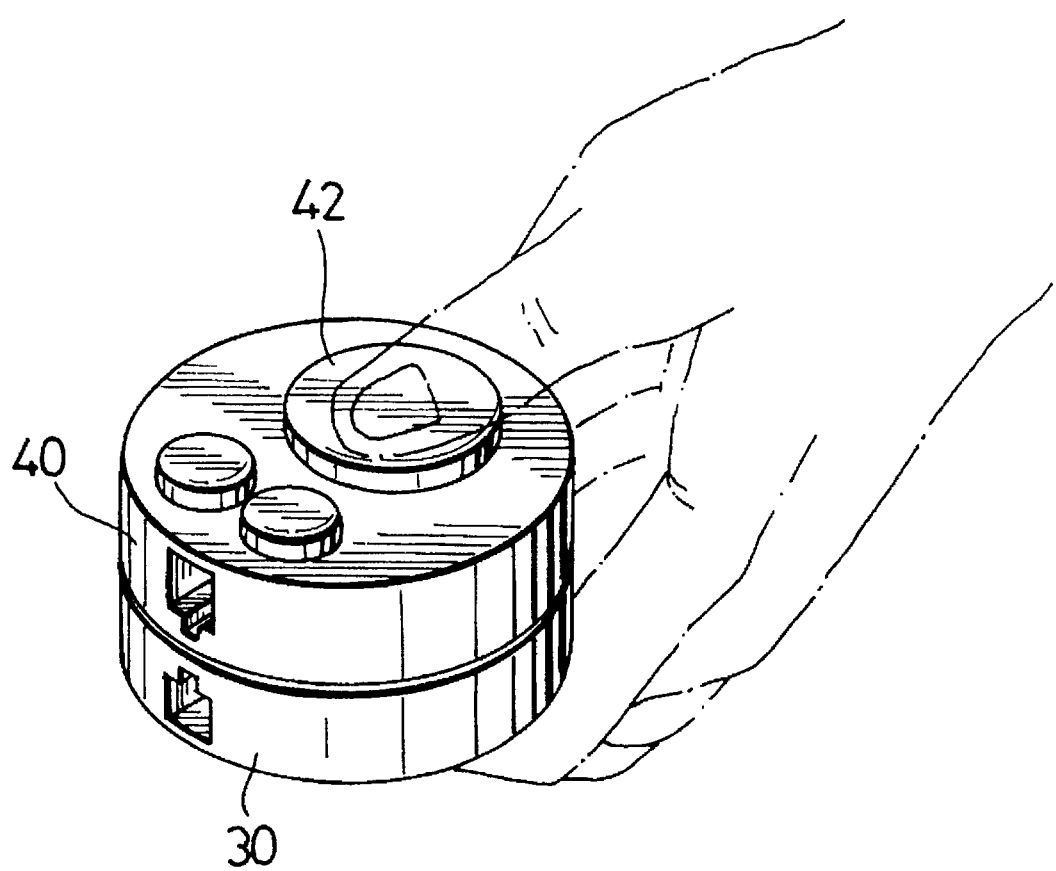
FIG. 4 is a schematic perspective view showing the housings of the handheld control units of the controller according to the first preferred embodiment of the present invention when connected separably to one another.

Referring now to FIGS. 3 and 4, in operation, the housings 30, 40 can be received removably and respectively in the retaining recesses 51 of the retaining seat 50 such that the male and female fasteners 52,53 on the bottom surface of the housings 30,40 engage the male and female fasteners 54,55 on the recess bottoms of the retaining seats 50, thereby retaining the housings 30,40 in the retaining recesses 51. Alternatively, the housings 30,40 may be interconnected by virtue of engagement between the male and female fasteners 52,53 such that the finger operating surfaces of the housings 30,40 are opposite to one another, thereby permitting simultaneous operation of the control units 3,4 with one hand.

Figure 6:
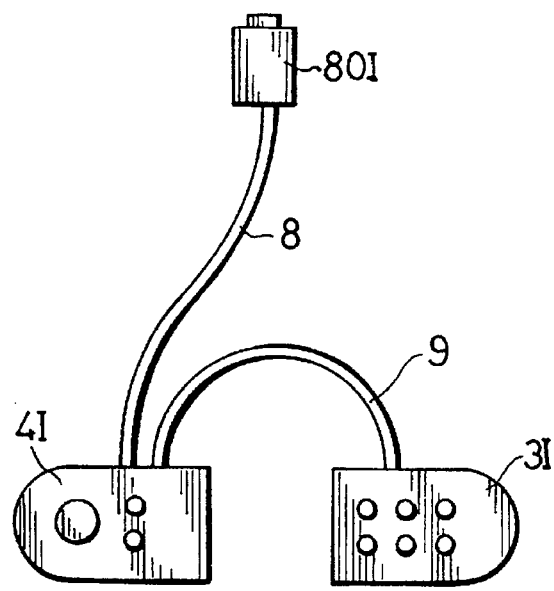
FIG. 6 is a schematic view illustrating the electrical connection between a video game console and a controller in accordance with a second preferred embodiment of the present invention.

Referring now to FIG. 6, a second preferred embodiment of the present invention is shown. In this embodiment, the transmitting means of the first control unit (3I) includes a first cable 9 having one end portion connected electrically to the control button unit thereof and an opposite end portion connected electrically to the control button unit of the second control unit (4I). The transmitting means of the second control unit (4I) includes a second cable 8 having one end portion connected electrically to the control button unit thereof and an opposite end portion connected electrically to the connector (80I).

Figure 7:
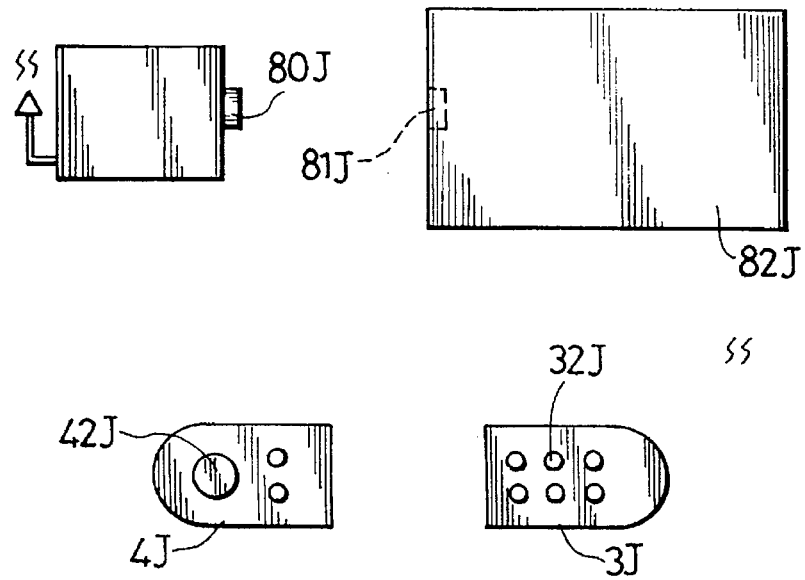
FIG. 7 is a schematic view illustrating the electrical connection between a video game console and a controller in accordance with a third preferred embodiment of the present invention.

With reference to FIG. 7, a third preferred embodiment of the present invention is shown. In this embodiment, the transmitting means of each of the control units (3J,4J) includes a wireless radio signal transmitter (T) which is connected electrically to the respective control button unit and which transmits wireless radio signals when the control buttons (32J,42J) are operated. The controller further includes a wireless radio signal receiver (R) which receives the wireless radio signals from the wireless radio signal transmitter (T) and which is connected electrically to a connector (80J) that is adapted to be connected electrically to the processing unit of the video game console (82J) via a receptacle (81J).

Figure 8:
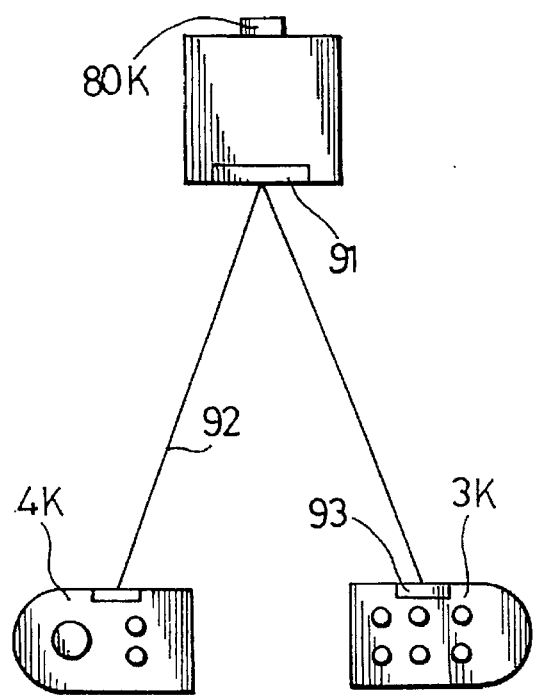
FIG. 8 is a schematic view illustrating the electrical connection between a video game console and a controller in accordance with a fourth preferred embodiment of the present invention.

Referring to FIG. 8, a fourth preferred embodiment of the present invention is shown. In the present embodiment, the transmitting means of each of the control units (3K,4K) includes an infrared signal transmitter 93 which is connected electrically to the respective control button unit and which transmits infrared signals 92 when the control buttons (32K, 42K) are operated. The controller further includes an infrared signal receiver 91 which receives the infrared signals 92 from the infrared signal transmitter 93 and which is connected electrically to a connector (80K) that is adapted to be connected electrically to the processing unit of the video game console.

Accordingly, the controller of the present invention has the following advantages:

1. The housings of the control units of the controller are separable in accordance with the user's needs, thereby enhancing flexibility of the controller when in use.

2. Only the control unit which has a damaged control button needs to be repaired, thereby minimizing the repair cost.

3. The controller of the present invention can be used with a conventional video game console by merely connecting the connector of the controller to a predetermined port of the conventional video game console.

4. Since the housings of the control units of the controller are separable, it is convenient for a more experienced user to assist a less experienced user in operating some of the control buttons.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A controller for a video game console, comprising first and second handheld control units, each of which has a housing with a finger operating surface that is provided with a control button unit, means for transmitting signals to the video game console when said control button unit of each of said control units is operated and means for releasably interconnecting said housings of said handheld control units, said interconnecting means including a retaining seat having a top side formed with a pair of spaced retaining recesses, each of said retaining recesses removably receiving a respective one of said housings therein.

2. The controller of claim 1, wherein each of said housings further has a bottom surface opposite to said finger operating surface thereof, said interconnecting means further including male and female fasteners provided respectively on said bottom surface of said housings so as to interconnect separably and selectively said housings when the housings are removed from their retaining recesses such that said finger operating surfaces of said housings are opposite to one another.

3. The controller of claim 2, wherein each of said retaining recesses of said retaining seat has a recess bottom provided with one of male and female fasteners for engaging said male and female fasteners of said interconnecting means so as to retain said housings in said retaining recesses.

4. The controller of claim 1, further comprising a connector which is adapted to be connected electrically to the video game console, said transmitting means of each of said control units including a cable which has one end portion connected electrically to said control button unit thereof and an opposite end portion connected electrically to said connector.

5. The controller of claim 1, further comprising a connector which is adapted to be connected electrically to the video game console, said transmitting means of said first control unit including a first cable which has one end portion connected electrically to said control button unit thereof and an opposite end portion connected electrically to said control button unit of said second control unit, said transmitting means of said second control unit including a second cable which has one end portion connected electrically to said control button unit thereof and an opposite end portion connected electrically to said connector.

6. The controller of claim 1, wherein said transmitting means of each of said control units includes a wireless radio signal transmitter which is connected electrically to said respective control button unit and which transmits wireless radio signals when the respective control button unit is operated, said controller further including a wireless radio signal receiver which receives said wireless signals from said wireless signal transmitters and which is adapted to be connected electrically to the video game console.

7. The controller of claim 1, wherein said transmitting means of each of said control units includes an infrared signal transmitter which is connected electrically to said respective control button unit and which transmits infrared signals when the respective control button unit is operated, said controller further including an infrared signal receiver which receives said infrared signals from said infrared signal transmitters and which is adapted to be connected electrically to the video game console.

8. A controller for a video game console, comprising first and second handheld control units, each of which has a housing with a finger operating surface and a bottom surface opposite from said finger operating surface, said finger operating surface being provided with a control button unit, means for transmitting signals to the video game console when said control button unit of each of said control units is operated and means for releasably interconnecting said housings of said handheld control units, said interconnecting means including male and female fasteners provided respectively on said bottom surfaces of said housings so as to interconnect separably and selectively said housings such that said finger operating surfaces of said housings are opposite to one another.

9. The controller of claim 8, further comprising a connector which is adapted to be connected electrically to the video game console, said transmitting means of each of said control units including a cable which has one end portion connected electrically to said control button unit therefor and a opposite end portion connected electrically to said connector.

10. The controller of claim 8, further comprising a connector which is adapted to be connected electrically to the video game console, said transmitting means of said first control unit including a first cable which has one end portion connected electrically to said control button unit thereof and an opposite end portion connected electrically to said control button unit of said second control unit, said transmitting means of said second control unit including a second cable which has one end portion connected electrically to said control button unit thereof and an opposite end portion connected electrically to said connector.

11. The controller of claim 8, wherein said transmitting means of each of said control units includes a wireless radio signal transmitter which is electrically connected to said respective control button unit and which transmits wireless radio signals when the respective control button unit is operated, said controller further including a wireless radio signal receiver which receives said wireless signals from said wireless signal transmitters and which is adapted to be connected electrically to the video game console.

12. The controller of claim 8, wherein said transmitting means of each of said control units includes an infrared signal transmitter which is connected electrically to said respective control button unit and which transmits infrared signals when the respective control button unit is operated, said controller further including an infrared signal receiver which receives said infrared signals from said infrared signal transmitters and which is adapted to be connected electrically to the video game console.

* * * * *